US012160027B2

(12) United States Patent
Cao et al.

(10) Patent No.: US 12,160,027 B2
(45) Date of Patent: Dec. 3, 2024

(54) METALLIZED DIELECTRIC WAVEGUIDE FILTERS HAVING IRREGULAR SHAPED RESONANT CAVITIES, SLANTED METALLIZED OPENINGS AND/OR SPURIOUS COUPLING WINDOWS

(71) Applicant: COMMSCOPE ITALY S.R.L., Agrate Brianza (IT)

(72) Inventors: Kejia Coco Cao, Cassago Brianza (IT); Giuseppe Resnati, Seregno (IT)

(73) Assignee: COMMSCOPE ITALY S.R.L., Agrate Brianza (IT)

( * ) Notice: Subject to any disclaimer, the term of this patent is extended or adjusted under 35 U.S.C. 154(b) by 323 days.

(21) Appl. No.: 17/905,120

(22) PCT Filed: Mar. 4, 2021

(86) PCT No.: PCT/EP2021/055432

§ 371 (c)(1),
(2) Date: Aug. 26, 2022

(87) PCT Pub. No.: WO2021/175975

PCT Pub. Date: Sep. 10, 2021

(65) Prior Publication Data

US 2023/0155267 A1 May 18, 2023

Related U.S. Application Data

(60) Provisional application No. 62/984,900, filed on Mar. 4, 2020.

(30) Foreign Application Priority Data

Aug. 21, 2020 (IT) ........................ 102020000020311

(51) Int. Cl.
*H01P 1/208* (2006.01)
*H01P 3/12* (2006.01)

(52) U.S. Cl.
CPC ................ *H01P 1/208* (2013.01); *H01P 3/12* (2013.01)

(58) Field of Classification Search
CPC ...... H01P 1/2002; H01P 1/2088; H01P 1/208; H01P 1/2053; H01P 1/2086; H01P 7/10;
(Continued)

(56) References Cited

U.S. PATENT DOCUMENTS 5,812,036 A 9/1998 Estrada
5,926,079 A * 7/1999 Heine .................. H01P 1/2088 333/208

(Continued)

FOREIGN PATENT DOCUMENTS

CN 110556613 A 12/2019
EP 3319166 A1 * 5/2018 ............ H01P 1/2053

(Continued)

OTHER PUBLICATIONS

"International Search Report and Written Opinion of the International Searching Authority", International Application No. PCT/EP2021/055432, May 28, 2021, 24 pp.

(Continued)

*Primary Examiner* — Lincoln D Donovan
*Assistant Examiner* — Tyler J Pereny
(74) *Attorney, Agent, or Firm* — Myers Bigel, P.A.

(57) ABSTRACT

A metallized dielectric waveguide filter includes first and second input/output ports and a dielectric block that has metallized top and bottom surfaces and metallized sidewalls. The dielectric block further includes a plurality of metallized openings that extend into the interior of the dielectric block, and these metallized openings divide the dielectric block into a plurality of resonator cavities. A first of the metallized openings extends at an oblique angle with respect to a first of the metallized outer sidewalls.

21 Claims, 6 Drawing Sheets

(58) Field of Classification Search
CPC ........ H01P 7/105; H01P 1/163; H01P 1/2056; H01P 1/2082; H01P 1/213; H01P 11/002; H01P 11/006; H01P 11/007; H01P 3/121; H01P 3/13; H01P 7/06; H01P 7/065
See application file for complete search history.

(56) References Cited

U.S. PATENT DOCUMENTS

| | | | |
|---|---|---|---|
| 6,104,262 | A | 8/2000 | Kich |
| 10,236,550 | B2 | 3/2019 | Tamiazzo et al. |
| 2016/0336632 | A1 | 11/2016 | Rogozine et al. |

FOREIGN PATENT DOCUMENTS

| | | | | |
|---|---|---|---|---|
| WO | 2014085383 | A1 | 6/2014 | |
| WO | 2017004417 | A1 | 1/2017 | |
| WO | 2019076456 | A1 | 4/2019 | |
| WO | WO-2019154496 | A1 * | 8/2019 | ............ H01P 1/2002 |

OTHER PUBLICATIONS

Accatino, L. , et al., "A compact waveguide filtering structure with transmission zeros for multi-beam satellites", 2017 IEEE MTT-S International Microwave Symposium (IMS), Honolulu, HI, Jun. 2017, pp. 737-740.
Ghorbaninejad, H. , et al., "Compact Bandpass Filters Utilizing Dielectric Filled Waveguides", Progress In Electromagnetics Research B, vol. 7, Apr. 4, 2008, pp. 105-115.
Hopfer, Samuel , "The Design of Ridged Waveguides", IRE Transactions—Microwave Theory and Techniques, vol. 3, Issue 5, Oct. 1955, pp. 20-29.
Rauscher, Christen , "Design of Dielectric-Filled Cavity Filters With Ultrawide Stopband Characteristics", IEEE Transactions on Microwave Theory and Techniques, vol. 53, No. 5, May 2005, 1777-1786.
Ruiz-Cruz, Jorge A., et al., "Ultra-Wideband LTCC Ridge Waveguide Filters", IEEE Microwave and Wireless Components Letters, vol. 17, No. 2, Feb. 2007, pp. 115-117.
Sandhu, Muhammad , et al., "Miniaturized Dielectric Waveguide Filters", International Journal of Electronics, vol. 103, No. 10, Feb. 2, 2016, pp. 1776-1787.
Tornielli Di Crestvolant, Vittorio , et al., "Dimensional Synthesis of Evanescent-Mode Ridge Waveguide Bandpass Filters", IEEE Transactions on Microwave Theory and Techniques, vol. 66, No. 2, Feb. 2018, pp. 954-961.
Yao, Hui-Wen , et al., "Quarter Wavelength Ceramic Combline Filters", IEEE Transactions On Microwave Theory and Techniques, vol. 44, No. 12, Dec. 1996, pp. 2673-2679.

* cited by examiner

METALLIZED DIELECTRIC WAVEGUIDE FILTERS HAVING IRREGULAR SHAPED RESONANT CAVITIES, SLANTED METALLIZED OPENINGS AND/OR SPURIOUS COUPLING WINDOWS

CROSS-REFERENCE TO RELATED APPLICATIONS

The present application is a 35 U.S.C. § 371 national stage application of PCT Application No. PCT/EP2021/055432, filed on Mar. 4, 2021, which itself claims priority to Italian Patent Application No. 102020000020311, filed Aug. 21, 2020 and under 35 U.S.C. § 119 to U.S. Provisional Patent Application Ser. No. 62/984,900, filed Mar. 4, 2020, the entire contents of all of which are incorporated herein by reference as if set forth fully herein in their entireties.

FIELD

The present invention relates generally to communications systems and, more particularly, to filters that are suitable for use in cellular communications systems.

BACKGROUND

Filters are electronic devices that selectively pass signals based on the frequency of the signal. Various different types of filters are used in cellular communications systems. Moreover, as new generations of cellular communications services have been introduced—typically without phasing out existing cellular communications services—both the number and types of filters that are used has expanded significantly. Filters may be used, for example, to allow radio frequency ("RF") signals in different frequency bands to share selected components of a cellular communications system and/or to separate RF data signals from power and/or control signals. Conventionally, metal resonant cavity filters have been used to implement many of the filters used in cellular communications systems. However, metal resonant cavity filters tend to be heavy and expensive to manufacture. As the number of filters used in a typical cellular communications system has proliferated, the need for smaller, lighter and/or less expensive filters has increased.

The "response" of a filter refers to the amount of energy that passes from a first port (e.g., an input port) of the filter to a second port (e.g., an output port) of the filter as a function of frequency. A filter response will typically include one or more pass-bands, which are frequency ranges where the filter passes signals with relatively small amounts of attenuation. A filter response also typically includes one or more stop-bands. A stop-band refers to a frequency range where the filter will substantially not pass signals, usually because the filter is designed to reflect backwards any signals that are incident on the filter in this frequency range. In some applications, it may be desirable that the filter response exhibit a high degree of "local selectivity," meaning that the transition from a pass-band to an adjacent stop-band occurs over a narrow frequency range. One technique for enhancing local selectivity is to add transmission zeros in the filter response. A "transmission zero" refers to a portion of a filter frequency response where the amount of signal energy that passes is very low. Transmission zeros are most typically achieved using cross-couplings.

Resonant cavity filters include a plurality of resonant cavities. Cross-coupling, which is the most common technique used to increase local selectivity in a resonant cavity filter, refers to intentional coupling between non-adjacent resonating cavities. Depending on the relative location of the transmission zero with respect to the pass-band, the sign of the required cross-coupling may vary. When cross-couplings are used to create transmission zeros, the resonant cavities are often arranged in some form of a planar grid as opposed to a single row of resonant cavities. Such a two-dimensional distribution of resonant cavities facilitates coupling between resonant cavities that are not adjacent each other along a main transmission path through the filter (i.e., cross-couplings). U.S. Pat. No. 5,812,036 ("the '036 patent"), the contents of which are incorporated herein by reference, discloses various resonant cavity filters that have such two-dimensional cavity arrangements that include cross-coupling.

FIG. 1 is a schematic top sectional view of a conventional metal resonant cavity filter 10 (which is one of the filters discussed in the above-referenced '036 patent). As shown in FIG. 1, the resonant cavity filter 10 includes a metallic housing 12 that has walls 14 formed therein that define resonant cavities 18-1 through 18-6. The filter 10 also includes a floor 28 and a top cover (not shown) that encloses the cavities. While the example filter 10 illustrated in FIG. 1 includes a total of six cavities 18, it will be appreciated that any appropriate number of cavities 18 may be provided as necessary to provide a filter having desired filtering characteristics. Note that herein when multiple of the same elements or structures are provided, they may be referred to in some instances using two part reference numerals, where the two parts are separated by a dash. Herein, such elements may be referred to individually by their full reference numeral (e.g., cavity 18-2) and may be referred to collectively by the first part of the applicable reference numeral (e.g., the cavities 18).

Still referring to FIG. 1, a coaxial resonating element or "resonator" 20-1 through 20-6 is provided in each of the respective cavities 18-1 through 18-6. The walls 14 may include openings or "windows" 16-1 through 16-5 that allow resonators 20 in adjacent ones of the cavities 18 to couple to each other along a U-shaped main transmission path that extends from an input port 22 to an output port 24 of the filter 10. An RF signal input at input port 22 generally follows the main transmission path and hence passes through each of the resonant cavities 20 in numerical order (i.e., from cavity 20-1 to cavity 20-2, . . . to cavity 20-6) and is output at output port 24 as a filtered signal. In addition, the filter 10 includes two cross-coupling windows 26-1, 26-2 that enable cross-coupling between two pairs of non-adjacent resonators 20 (namely, between the resonators 20-1 and 20-6 in cavities 18-1 and 18-6 and between the resonators 20-2 and 20-5 in cavities 18-2 and 18-5). The main couplings between the five sequential pairs of resonators 20 and the two cross-couplings between the two pairs of non-adjacent resonators 20 contribute to the overall transfer function of the filter 10. As discussed above, the cross-couplings may be used to generate transmission zeros in the filter response.

Another known type of filter is the metallized dielectric waveguide filter. A waveguide is a metal conduit that may be used to confine and direct RF signals. A metallized dielectric waveguide filter is a waveguide filter that is formed using one or more blocks of dielectric material that have metallized exterior surfaces. Metallized dielectric waveguide filters are typically formed by metallizing the outside of one or more ceramic blocks using a metallization process such as screen printing, spray coating, dip coating or thin film metallization process.

The use of waveguides filled with a solid dielectric material allows a reduction in the overall size of the filter. Generally speaking, the higher the dielectric constant of the dielectric material, the greater the dimensions of the filter may be reduced. Metalized dielectric waveguide filters can exhibit a very high ratio of Q factor to volume, have low insertion losses, and can readily handle 10-20 Watts of power without generating unacceptable levels of passive intermodulation products. As such, metalized dielectric waveguide filters may be well-suited for many cellular applications. Metallized dielectric waveguide filters, however, can be relatively heavy, and hence they are generally only used at higher frequencies where the shorter wavelength of the RF signals reduces the overall size and weight of the filter.

A metallized dielectric waveguide filter includes a plurality of resonant cavities that are defined along a main transmission path that extends between an input port and an output port of the filter. Pairs of vertically-extending metallized openings which extend through the dielectric block are formed within the dielectric block. These pairs of metallized openings form metal walls within the dielectric block in order to define the individual resonant cavities within the metallized dielectric block. Openings between each pair of vertically-extending metal-plated holes form coupling windows. An electromagnetic wave that enters a resonant cavity is reflected back and forth between the two ends thereof, and will resonate at a characteristic frequency based on a given geometry of the resonant cavity. The resonance effect can be used to selectively pass certain frequencies through the coupling window into the next resonant cavity along the main transmission path. Additional openings in the form of "cross-coupling windows" may be provided between resonant cavities that are not adjacent each other along the main transmission path. These cross-coupling windows may be used to generate transmission zeros in the frequency response of the filter, as explained above.

FIG. 2A is a schematic top sectional view of a conventional 7-order Chebyshev metallized dielectric waveguide filter 100 that has a filter response with a pair of transmission zeros. FIG. 2B is a schematic top view of the metallized dielectric waveguide filter 100 of FIG. 2A. As shown in FIGS. 2A-2B, the metallized dielectric waveguide filter 100 comprises a solid block of dielectric material 110 that has metallization plated on the outer sidewalls 120 and top surface 122 (FIG. 2B) thereof. While not shown in the views of FIGS. 2A-2B, the bottom surface of the dielectric block 110 is also plated with metal. As shown in FIG. 2B, first and second input/output ports 112-1, 112-2 are provided on either side of the dielectric block 110. The first and second input/output ports 112-1, 112-2 may comprise, for example, coaxial connectors that are mounted within respective vertical openings 114-1, 114-2 in the dielectric block 110 (here vertical refers to the direction of an axis that is perpendicular to the plane defined by the top surface 122 of filter 100. The openings 114 may extend, for example, about halfway through the dielectric block 110.

Additional metallized openings 130-1, 130-2, 130-3 extend vertically all of the way through the dielectric block 110. Each metallized opening 130 may comprise one or more segments 132, which may be linear segments. The metallized openings 130 divide the dielectric block 110 into seven resonant cavities 140-1 through 140-7. Each metallized opening 130 is fairly long, and two of the three metallized openings 130 extend to a sidewall 120 of filter 100. Coupling windows 150, 160 are provided between selected adjacent pairs of resonant cavities 140. The coupling windows may include main coupling windows 150 and a cross-coupling window 160.

FIG. 3 is a schematic diagram illustrating the resonant cavities 140 included in the conventional metallized dielectric waveguide filter 100 of FIGS. 2A-2B and the different couplings between these resonant cavities 140. As shown in FIG. 3, the resonant cavities are disposed in two rows R1, R2, with each extending generally parallel to a longitudinal axis L of the filter 100 (see FIG. 2B). Each resonant cavity 140 is approximately the same size. Since the filter 100 is an odd order filter (i.e., it has an odd number of resonant cavities 140, the first row R1 has four resonant cavities 140 while the second row R2 only has three resonant cavities 140. As such, the dielectric block 110 has a "cut-out" section on the left side of bottom row R2 where no dielectric material is provided. As such, sidewalls 120-2 and 120-3 are each divided into two sidewall segments 120-2A, 120-2B and 120-3A, 120-3B. The main transmission path through the filter 100 extends from the first input/output port 112-1 through the seven resonant cavities 140-1 through 140-7 in numerical order to the second input/output port 112-2, as shown by the arrows between resonant cavities 140 in FIG. 3. The filter has six "main couplings" which refer to the couplings between adjacent resonant cavities 140 along the main transmission path. These main couplings are labelled $k_{1,2}$, $k_{2,3}$, $k_{3,4}$, $k_{4,5}$, $k_{5,6}$, and $k_{6,7}$ in FIG. 3. There also is one cross-coupling between resonant cavities 140-2 and 140-5 (through cross-coupling window 160) which is labelled $k_{2,5}$ in FIG. 3.

SUMMARY

Pursuant to some embodiments of the present invention, metallized dielectric waveguide filters are provided that include first and second input/output ports and a dielectric block that has metallized top and bottom surfaces and metallized sidewalls. The dielectric block further includes a plurality of metallized openings that extend into the interior of the dielectric block, and these metallized openings divide the dielectric block into a plurality of resonator cavities. A first of the metallized openings extends at an oblique angle with respect to a first of the metallized outer sidewalls.

In some embodiments, the first and/or a second of the metallized openings may extend at an angle of between 15° and 75° with respect to the first of the metallized outer sidewalls. In some embodiments, the outer sidewalls may define a generally rectangular shape.

In some embodiments, the dielectric block may be divided into first and second rows of resonator cavities, where each of these rows extends parallel to a longitudinal axis of the metallized dielectric waveguide filter.

In some embodiments, a plurality of main coupling windows may be provided within the dielectric block that define a main transmission path through the dielectric block. The main transmission path may extend from the first input/output port sequentially through each of the resonator cavities to the second input/output port. The main transmission path may cross from the first row of resonator cavities to the second row of resonator cavities at least once, at least twice, or at least three times in example embodiments. In some embodiments, the first of the metallized openings may be positioned between one of the resonator cavities in the first row and one of the resonator cavities in the second row.

In some embodiments, at least one cross-coupling window may be provided within the dielectric block that is configured to allow a pair of resonator cavities that are not adjacent each other along the main transmission path to cross-couple.

In some embodiments, the first of the metallized opening may form a first wall between the first of the resonator cavities and a third of the resonator cavities, a second of the metallized opening may form a second wall between the first of the resonator cavities and a second of the resonator cavities that is between the first of the resonator cavities and the third of the resonator cavities along the main transmission path. The first and second walls may define a coupling window between the first of the resonator cavities and the third of the resonator cavities.

In some embodiments, the dielectric block may be divided into first and second rows of resonator cavities that extend parallel to a longitudinal axis of the metallized dielectric waveguide filter, and the first and third of the resonator cavities may be in different ones of the first and second rows.

In some embodiments, a second of the metallized opening forms a first wall between a second of the resonator cavities and a third of the resonator cavities that is adjacent the second of the resonator cavities along the main transmission path, and a third of the metallized opening forms a second wall, the second wall and the third wall defining a coupling window between the second of the resonator cavities and a fourth of the resonator cavities.

In some embodiments, the dielectric block may be divided into first and second rows of resonator cavities, where each of these rows extends parallel to a longitudinal axis of the metallized dielectric waveguide filter, and the fourth of the resonator cavities and the second of the resonator cavities are in different ones of the first and second rows.

In some embodiments, a second of the metallized openings may extend substantially into a central region between a pair of resonator cavities that are adjacent each other along the main transmission path so as to define first and second coupling main windows between the pair of resonator cavities.

In some embodiments, at least one of the resonator cavities may have an angled inner sidewall.

Pursuant to further embodiments of the present invention, metallized dielectric waveguide filters are provided that include first and second input/output ports and a dielectric block that has metallized top and bottom surfaces and metallized outer sidewalls, the dielectric block further including a plurality of metallized openings that extend into the interior of the dielectric block, the metallized openings dividing the dielectric block into a plurality of resonator cavities. A first of the metallized opening forms a first wall between a first of the resonator cavities and a second of the resonator cavities, the second resonator cavity being adjacent the first of the resonator cavities along a main transmission path through the dielectric block that extends between the first input/output port and the second input/output port sequentially through each of the resonator cavities, and a second of the metallized opening forms a second wall. The first wall and the second wall define a coupling window between the first of the resonator cavities and a third of the resonator cavities.

In some embodiments, the third of the resonator cavities may be adjacent the second of the resonator cavities along the main transmission path.

In some embodiments, the resonator cavities are arranged in first and second rows that extend parallel to a longitudinal axis of the metallized dielectric waveguide filter, and the first of the resonator cavities and the third of the resonator cavities are in different ones of the first and second rows.

In some embodiments, the first of the metallized openings may extend at an oblique angle with respect to a first of the metallized outer sidewalls.

In some embodiments, the first of the metallized openings may extend at an angle of between 15° and 75° with respect to the first of the metallized outer sidewalls.

In some embodiments, the main transmission path may cross from the first row of resonator cavities to the second row of resonator cavities at least once.

In some embodiments, a third of the metallized openings may extend substantially into a central region between a pair of resonator cavities that are adjacent each other along the main transmission path so as to define first and second coupling main windows between the pair of resonator cavities.

Pursuant to further embodiments of the present invention, metallized dielectric waveguide filters are provided that include first and second input/output ports and a dielectric block that has metallized top and bottom surfaces and metallized outer sidewalls, the dielectric block further including a plurality of metallized openings that extend into the interior of the dielectric block, the metallized openings dividing the dielectric block into a plurality of resonator cavities. A main transmission path is defined through the dielectric block that extends between the first input/output port and the second input/output port sequentially through each of the resonator cavities. A first of the metallized openings extends substantially into a central region between a first of resonator cavities and a second of the resonator cavities that are adjacent each other along the main transmission path so as to define first and second coupling main windows between the first and second of the resonator cavities.

In some embodiments, the dielectric block may be divided into a first row of resonator cavities and a second row of resonator cavities, where each of the first row of resonator cavities and the second row of resonator cavities extends parallel to a longitudinal axis of the metallized dielectric waveguide filter, and wherein the first of resonator cavities is in the first row and the second of resonator cavities is in the second row.

In some embodiments, the first of the metallized openings may extend at an angle of between 15° and 75° with respect to both a first of the metallized outer sidewalls and with respect to a second of the metallized outer sidewalls that is substantially perpendicular to the first of the metallized outer sidewalls.

In some embodiments, the first of the metallized openings may be positioned between one of the resonator cavities in the first row and one of the resonator cavities in the second row.

In some embodiments, a second of the metallized openings may form a first wall between a third of the resonator cavities and a fifth of the resonator cavities, a third of the metallized opening forms a second wall between the third of the resonator cavities and a fourth of the resonator cavities that is between the third of the resonator cavities and the third fifth the resonator cavities along the main transmission path, the first wall and the second wall defining a coupling window between the third of the resonator cavities and the fifth of the resonator cavities.

In some embodiments, the dielectric block may be divided into first and second rows of resonator cavities that each extend parallel to a longitudinal axis of the metallized dielectric waveguide filter, and the third of the resonator cavities and the fifth of the resonator cavities are in different ones of the first and second rows.

Pursuant to further embodiments of the present invention, metallized dielectric waveguide filters are provided that include first and second input/output ports and a dielectric block that has metallized top and bottom surfaces and metallized outer sidewalls, the dielectric block further including a plurality of metallized openings that extend into the interior of the dielectric block, the metallized openings forming metallized inner walls within the dielectric block. The metallized outer walls and the metallized inner walls define a plurality of main coupling windows that form a main transmission path through the dielectric block that extends between the first input/output port and the second input/output port sequentially through each of the resonator cavities, a first cross-coupling window between two of the resonant cavities that are not adjacent each other along the main transmission path, and a first spurious coupling window. The first spurious coupling window is configured to generate a cross-coupling between first and second of the resonant cavities that are not adjacent each other along the main transmission path that substantially cancels coupling between the first and second of the resonant cavities that occurs along the main transmission path.

In some embodiments, the dielectric block may be divided into first and second rows of resonator cavities, that each extend parallel to a longitudinal axis of the metallized dielectric waveguide filter. The first and second of the resonator cavities are in different ones of the first and second rows.

In some embodiments, the spurious coupling window may be defined between a first of the metallized inner walls and a second of the metallized inner walls.

In some embodiments, the first metallized inner wall may be between the first of the resonator cavities and the second of the resonator cavities and the second metallized inner wall is between the first of the resonator cavities and a third of the resonator cavities that is in between the first and second of the resonator cavities along the main transmission path.

In some embodiments, the first metallized inner wall may be between the first of the resonator cavities and a third of the second of the resonator cavities and the second metallized inner wall is between the first of the resonator cavities and a fourth of the resonator cavities that is in between the first and second of the resonator cavities along the main transmission path.

In some embodiments, the first metallized inner wall may be between the first of the resonator cavities and a third of the resonator cavities and the second metallized inner wall is between the second of the resonator cavities and the third of the resonator cavities, and the third of the resonator cavities is in between the first and second of the resonator cavities along the main transmission path.

In some embodiments, a first of the metallized inner walls may extend at an oblique angle with respect to a first of the metallized outer sidewalls. The oblique angle may be an angle of between 15° and 75°.

In some embodiments, the dielectric block may be divided into first and second rows of resonator cavities that each extend parallel to a longitudinal axis of the metallized dielectric waveguide filter. The main transmission path may cross from the first row of resonator cavities to the second row of resonator cavities at least twice. In some embodiments, the first and second of the resonant cavities may be in different ones of the first and second rows.

In some embodiments, a first of the metallized openings may extend substantially into a central region between a pair of resonator cavities that are adjacent each other along the main transmission path so as to define first and second coupling main windows between the pair of resonator cavities. In some embodiments, the spurious coupling window may be defined by the first and second of the metallized openings.

In some embodiments, at least one of the resonator cavities may have an angled inner sidewall.

Pursuant to still further embodiments of the present invention, metallized dielectric waveguide filters are provided that include first and second input/output ports and a dielectric block that has metallized top and bottom surfaces and metallized outer sidewalls, the dielectric block further including a plurality of metallized openings that extend into the interior of the dielectric block, the metallized openings dividing the dielectric block into a plurality of resonator cavities. The resonator cavities are arranged in a first row and a second row within the dielectric block, where each of the first row of resonator cavities and the second row of resonator cavities extends parallel to a longitudinal axis of the metallized dielectric waveguide filter. A first of the metallized openings forms an inner wall that separates one of the resonator cavities in the first row from one of the resonator cavities in the second row. A longitudinal axis of the first of the metallized openings forms an oblique angle with the longitudinal axis of the metallized dielectric waveguide filter.

In some embodiments, the oblique angle is between 15° and 75°.

DETAILED DESCRIPTION

Figure 1:
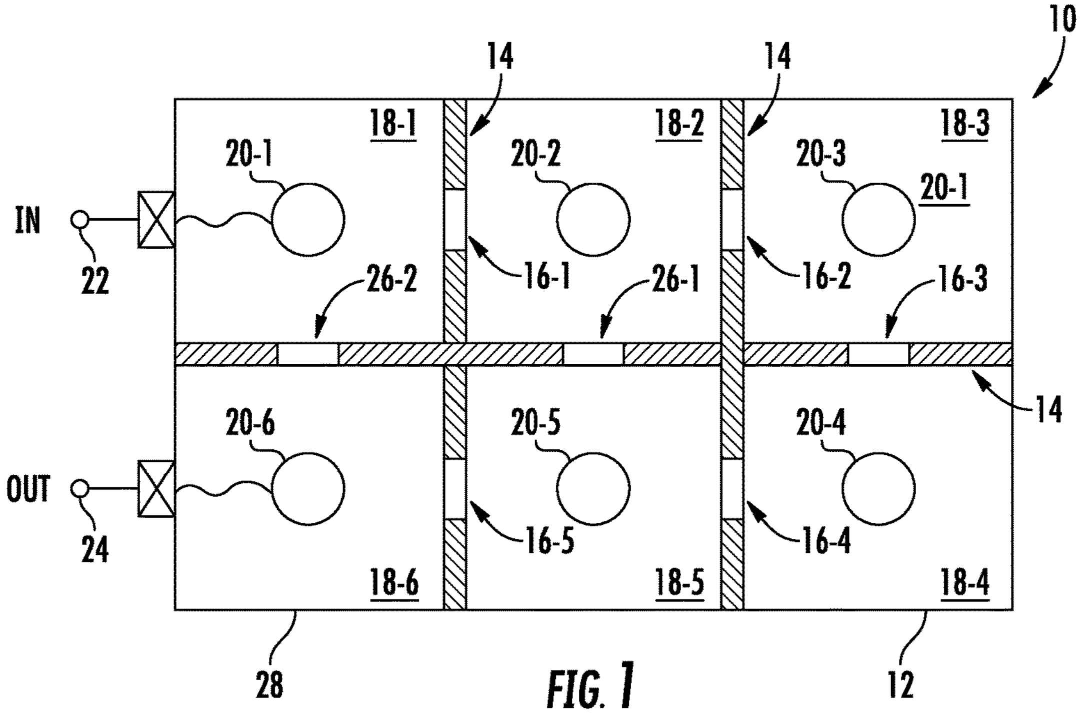
FIG. 1 is a schematic top sectional view of a conventional resonant cavity filter that has cross-coupling between selected cavities.
Figure 2A:
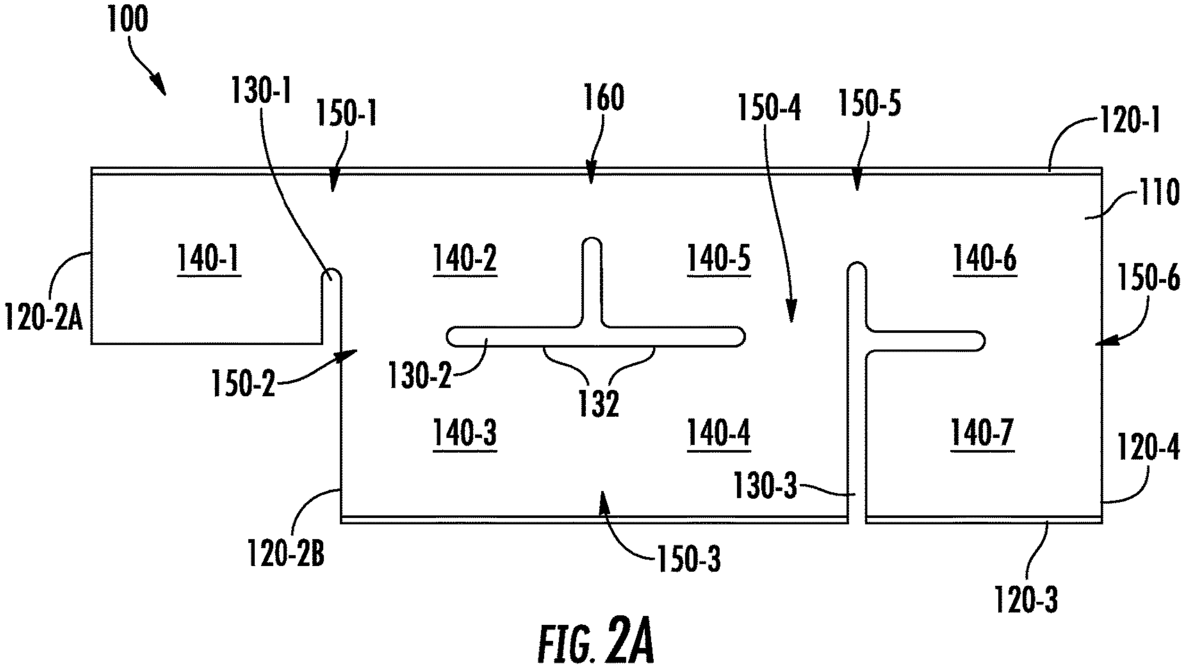
FIG. 2A is a schematic top sectional view of a conventional 7-order Chebyshev filter metallized dielectric waveguide filer.
Figure 2B:
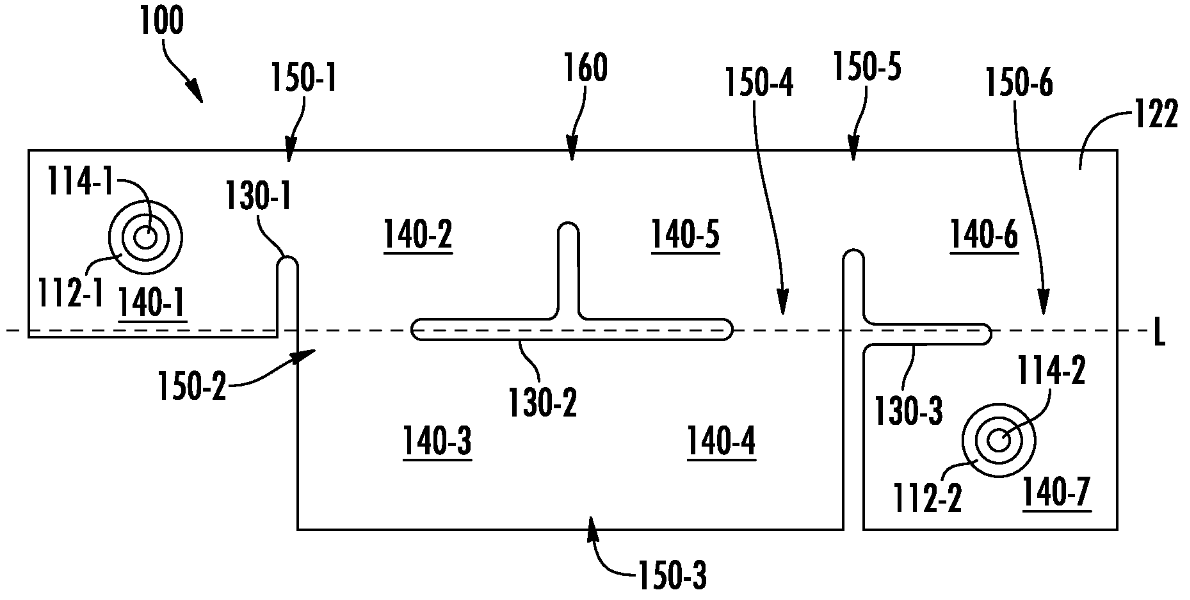
FIG. 2B is a schematic top view of the metallized dielectric waveguide filter of FIG. 2A.
Figure 3:
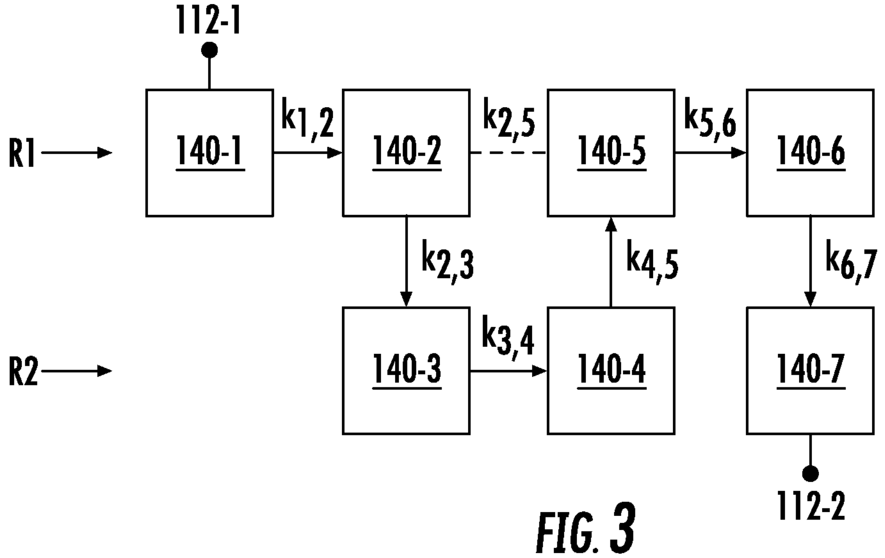
FIG. 3 is a schematic diagram illustrating the resonant cavities included in the metallized dielectric waveguide filter of FIGS. 2A-2B and the different couplings between these resonant cavities.

While the conventional metallized dielectric waveguide filter 100 described above with reference to FIGS. 2A-3 may be suitable for various applications, it has a number of potential disadvantages. First, conventional metallized dielectric waveguide filters may be relatively heavy and expensive to manufacture. As the number of filters used in a typical cellular communications system has proliferated, weight and expense concerns become heightened. Second, conventional metallized dielectric waveguide filters, and particularly odd-order filter designs, may be more fragile than most conventional filters, due to the above-described long slots that extend through the dielectric block of these filters. If the filter is subjected to twisting forces, there is a danger that the filter may crack or even break. Third, while careful design of the coupling windows may reduce unintended coupling between non-adjacent resonant cavities, it may be very difficult to completely eliminate such unwanted couplings, and these unwanted couplings may reduce the RF performance of the filter.

Figure 4A:
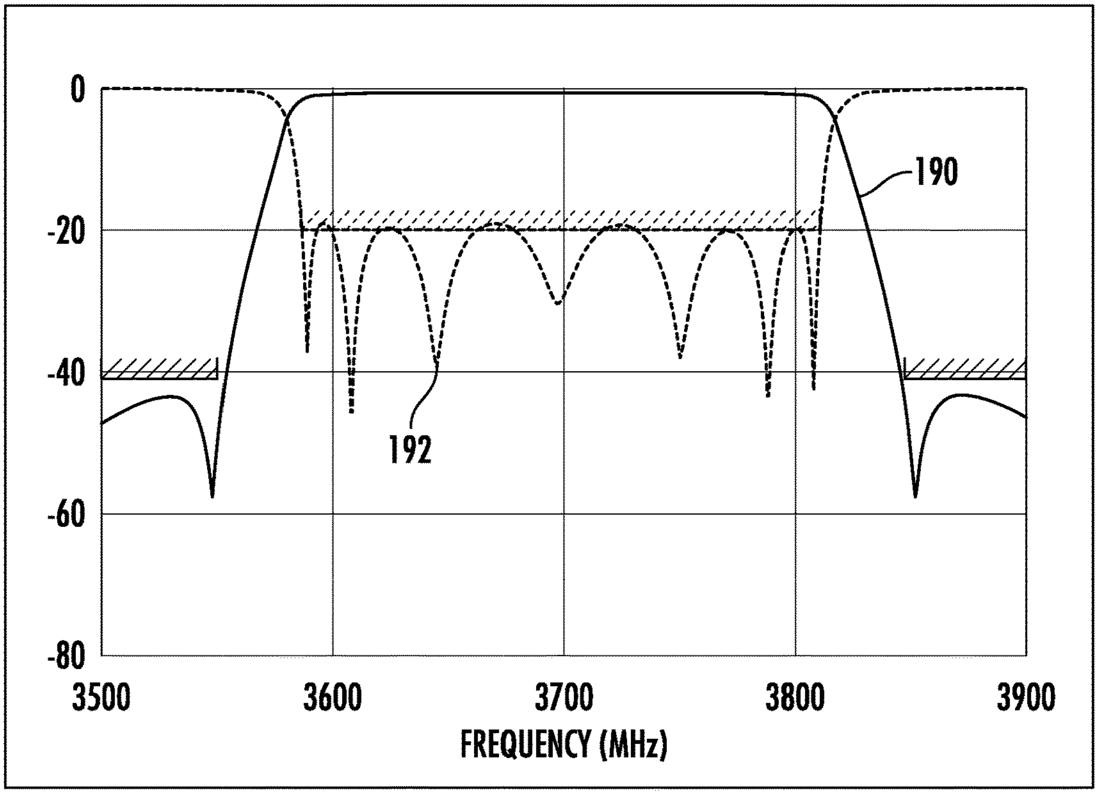
FIG. 4A is a graph illustrating the simulated return loss and insertion loss for an ideal 7-order Chebyshev filter having a response with a pair of symmetric transmission zeros.
Figure 4B:
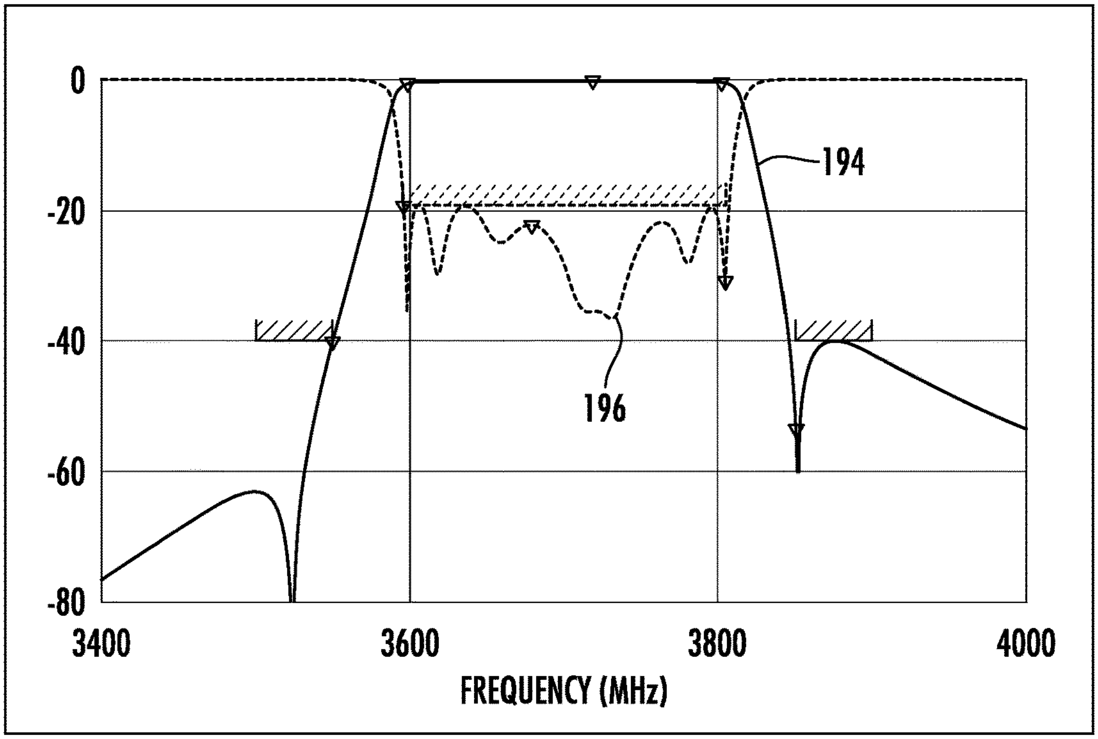
FIG. 4B is a graph illustrating the simulated return loss and insertion loss for the filter of FIGS. 2A-2B.

For example, FIG. 4A is a graph illustrating the simulated return loss (curve 190) and insertion loss (curve 192) performance of an ideal metallized dielectric waveguide 7-order Chebyshev bandpass filter that is designed to have a passband of 3.6-3.8 GHz (the Q-value used in the simulation was assumed to be 1500). As shown in FIG. 4A, a return loss of less than −19 dB is achieved across the entire pass band, and the return loss rises very sharply just outside of the pass band (to less than −1 dB within about 25 MHz on either side of the pass band). The insertion loss curve 192 also exhibits excellent performance, with the insertion loss being less than 1 dB across the full pass band and with two symmetric transmission zeros (nearly 60 dB rejection) at about 50 MHz on either side of the pass band. In contrast, FIG. 4B illustrates the simulated response of the conventional metallized dielectric waveguide 7-order Chebyshev bandpass filter 100 of FIGS. 2A-2B. In FIG. 4B, curve 194 shows the simulated return loss performance and curve 196 shows the simulated insertion loss performance. While the performance is somewhat similar to the ideal performance shown in FIG. 4A, it can be seen that the transmission zeros are not very symmetric, in both location and depth. Thus, improved metallized dielectric waveguide filter designs are desirable that address the above-described issues with conventional designs.

Pursuant to embodiments of the present invention, metallized dielectric waveguide filters are provided that are smaller, lighter and more mechanically robust than conventional metallized dielectric waveguide filters, and which also exhibit improved RF performance. The metallized dielectric waveguide filters according to embodiments of the present invention may include new coupling window structures that are formed using smaller metallized openings through the dielectric block. The use of such smaller metallized openings may improve the mechanical integrity of the filter and the new coupling windows may also allow the filter to be designed to cancel unwanted couplings between resonant cavities that are not adjacent each other along the main transmission path through the filter. By at least partially cancelling these unwanted couplings, the RF performance of the filter may be improved. Additionally, at least some of the resonant cavities may have irregular shapes, which may allow the overall dimensions of the filter to be reduced, particularly in odd-order filter designs. For example, one or more metallized openings may be formed through the dielectric block that extend through the dielectric block at an oblique angle with respect to the sidewalls of the filter and/or with respect to a longitudinal axis of the filter.

The metallized dielectric waveguide filters according to embodiments of the present invention may be small, low loss and exhibit a very high Q factor. They may also have high power handling capabilities, and be reasonably lightweight. These filters may also be cheaper and easier to manufacture than conventional die-cast coaxial cavity filters.

The metallized dielectric waveguide filters according to embodiments of the present invention may include a dielectric block that has metallized top and bottom surfaces and metallized sidewalls. A plurality of metallized openings that extend into the interior of the dielectric block, and these metallized openings may divide the dielectric block into a plurality of resonator cavities. In some embodiments, one of the metallized openings may extend at an oblique angle with respect to a first of the metallized outer sidewalls.

In other embodiments, a first of the metallized openings may form a first wall between a first of the resonator cavities and a second of the resonator cavities that is adjacent the first of the resonator cavities along a main transmission path through the dielectric block. A second of the metallized opening may form a second wall. The first and second walls may define a coupling window between the first of the resonator cavities and a third of the resonator cavities.

In still other embodiments, one of the metallized openings may extend substantially into a central region between a first of resonator cavities and a second of the resonator cavities that are adjacent each other along the main transmission path so as to define first and second coupling main windows between the first and second of the resonator cavities.

In yet additional embodiments, the metallized openings may form a plurality of metallized openings forming metallized inner walls within the dielectric block. The metallized inner and outer walls may define (1) a plurality of main coupling windows that form the main transmission path through the dielectric block, (2) a first cross-coupling window between two of the resonant cavities that are not adjacent each other along the main transmission path, and (3) at least one spurious coupling window. The spurious coupling window may be configured to generate a cross-coupling between first and second of the resonant cavities that are not adjacent each other along the main transmission path that substantially cancels coupling between the first and second of the resonant cavities that occurs along the main transmission path.

In further embodiments, the resonator cavities may be arranged in first and second rows within the dielectric block, where each of these rows extend parallel to a longitudinal axis of the metallized dielectric waveguide filter. One of the metallized openings may form an inner wall that separates one of the resonator cavities in the first row from one of the resonator cavities in the second row. A longitudinal axis of this metallized opening may form an oblique angle with the longitudinal axis of the metallized dielectric waveguide filter.

Metallized dielectric waveguide filters according to embodiments of the present invention will now be discussed in greater detail with respect to FIGS. 5A-7.

Figure 5A:
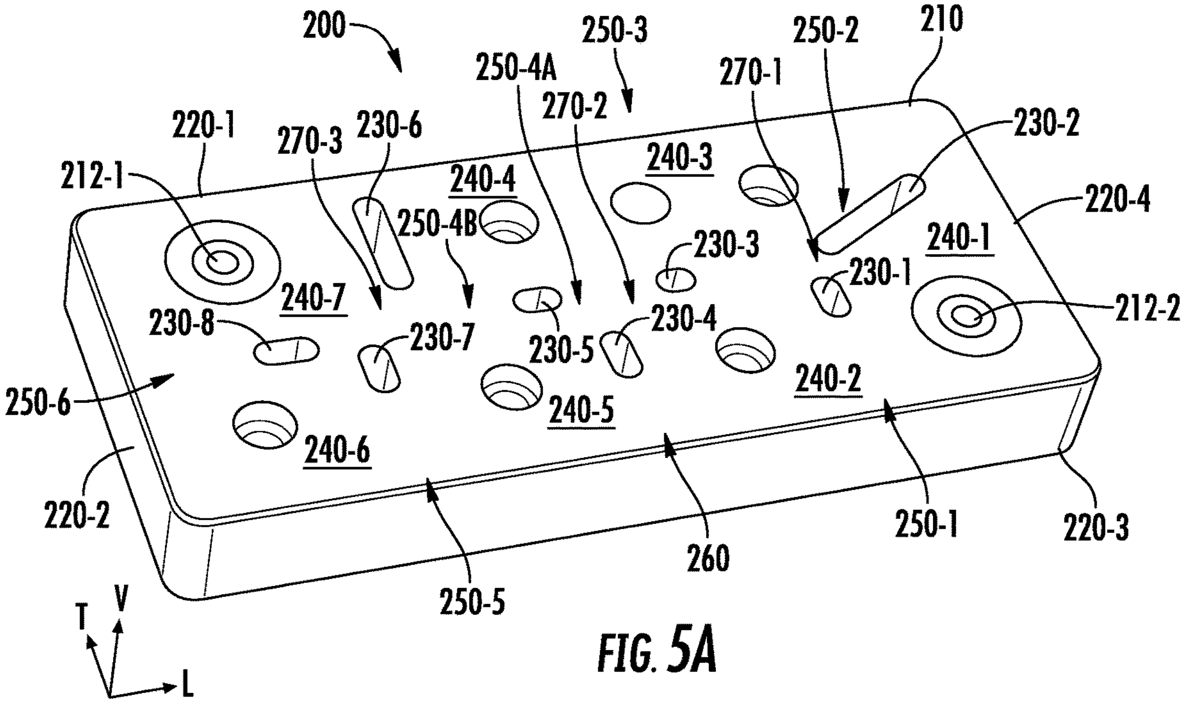
FIG. 5A is a perspective view of a metallized dielectric waveguide filter according to embodiments of the present invention with the input/output connectors thereof omitted.
Figure 5B:
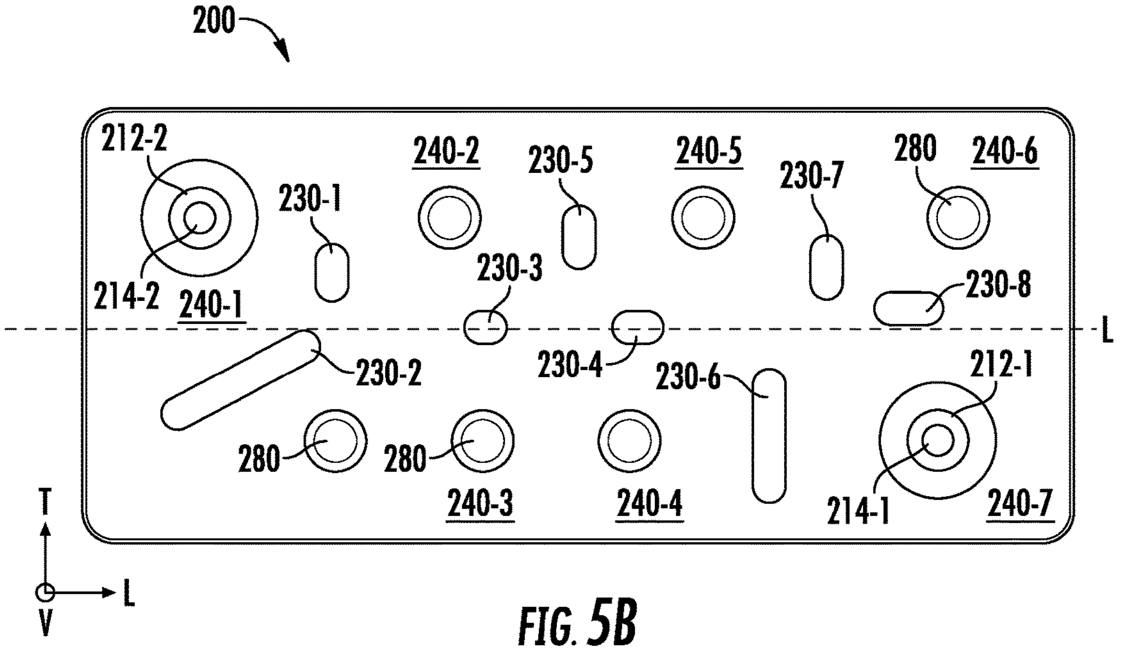
FIG. 5B is a top view of the metallized dielectric waveguide filter of FIG. 5A.

FIGS. 5A and 5B are a perspective view and top view, respectively, of a metallized dielectric waveguide filter 200 according to certain embodiments of the present invention. The filter 200 may be, for example, a band pass filter that is designed to operate in the 3.6-3.8 GHz band, with a pass band return loss of less than −17 dB, a pass band insertion loss of less than 1.2 dB, out-of-band rejection of at least 40 dB in the 3400-3540 MHz and 3860-4000 MHz frequency bands, and pass band ripple of less than 0.9 dB. The filter 200 has a 7-order Chebyshev design with a pair of symmetric transmission zeros. The filter has a "single layer" design with two rows of resonant cavities formed in a metallized dielectric block.

As shown in FIGS. 5A-5B, the metallized dielectric waveguide filter 200 is a generally rectangular device that extends along a longitudinal axis L. The filter also extends along a "transverse" axis T and a vertical axis V, with each axis being perpendicular to the other two axes. The filter 200 has sidewalls 220-1 through 220-4 a top surface 222 and a bottom surface 224 (not visible in the figures). The filter comprises a solid block of dielectric material 210 that has metallization plated or otherwise formed on the exterior thereof. A dielectric constant of the dielectric material of the dielectric block 210 may be, for example, between 15 and 40. In an example embodiment, the dielectric material may comprise a ceramic. First and second input/output ports 212-1, 212-2 are provided on either side of the filter 200. The first and second input/output ports 212-1, 212-2 may comprise, for example, coaxial connectors (not shown) that are mounted within respective vertical openings 214-1, 214-2 in the dielectric block 210. The openings 214 may extend, for example, about halfway through the dielectric block 210.

A plurality of metallized openings 230-1 through 230-7 extend vertically all of the way through the dielectric block 210. Each metallized opening 230 may be formed, for example, by drilling, cutting or punching a hole all the way through the dielectric block 210 prior to the metallization operation that is used to plate or otherwise deposit a metal layer on the sidewalls 220 and top and bottom surfaces 222, 224 of the dielectric block 210. The metallization operation may likewise coat the interior of the openings through the dielectric block 210 to form the metallized openings 230. The metallized openings 230 tend to be much shorter (in their length direction) as compared to the metallized openings 130 in the conventional metallized dielectric waveguide filter 100 discussed above.

Figure 5C:
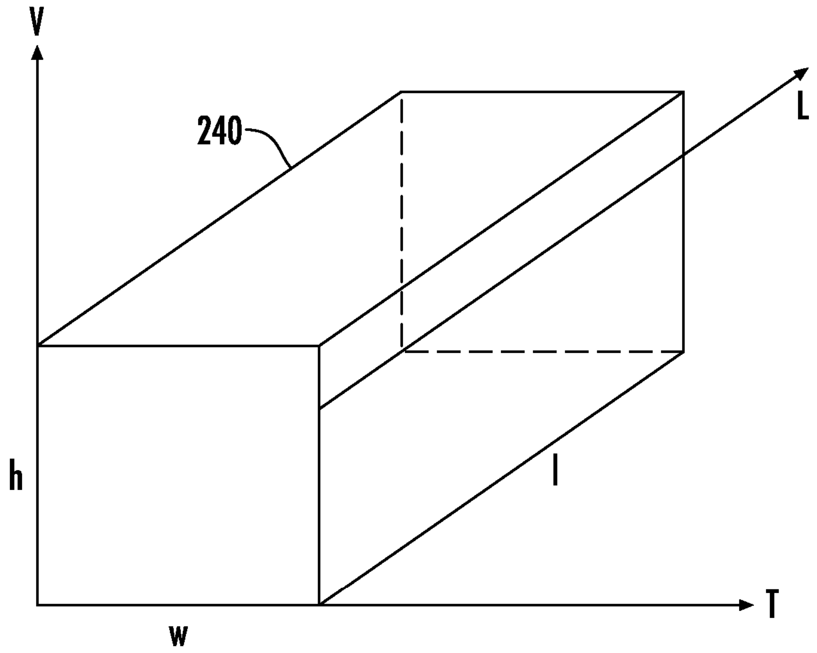
FIG. 5C is a schematic perspective view of one of the resonant cavities of the metallized dielectric waveguide filter of FIGS. 5A-5B.

The metallized openings 230 divide the dielectric block 210 into seven resonant cavities 240-1 through 240-7. FIG. 5C is a schematic view of one of the resonant cavities 240 of metallized dielectric waveguide filter 200. As shown in FIG. 5C, the resonant cavity 240 has a length l, a width w and a height h. The length dimension is the longitudinal direction of the dielectric block 210 in which the resonant cavity 240 is formed. The width and height dimensions are transverse to the length dimension and perpendicular to each other. All three dimensions are also shown in FIG. 5C with respect to resonant cavity 240.

Each resonant cavity 240 has a resonant frequency. For a resonant cavity 240 that has a rectangular shape, the resonant frequency $f_{res}$ may be determined based on the dimensions of the cavity and the dielectric constant (ε) of the dielectric material as follows:

$$fres-cav=\frac{1}{2\pi\sqrt{\mu\varepsilon}}\cdot\sqrt{\left(\frac{\pi}{w}\right)^2+\left(\frac{\pi}{l}\right)^2} \tag{1}$$

where μ is the magnetic permeability of the dielectric material. Typically each resonant cavity 240 is designed to have approximately the same resonant frequency, which may be the center frequency of the pass band of the filter 200.

As is apparent from Equation (1), a desired resonant frequency for a resonant cavity 240 can be obtained by manipulating the length (l) and width (w) of the resonant cavity 240 and the dielectric constant of the dielectric block 210. However, the length l and width w (as well as the height h) heavily impact the electric and magnetic field distributions within the resonant cavity 240. Consequently, the length l, width w and height h must also be selected to take into account the couplings that are required between adjacent and non-adjacent resonant cavities 240 in order to obtain a desired filter response.

Referring again to FIGS. 5A-5B, the resonant cavities 240-1 through 240-7 are located in similar positions to the resonant cavities 140-1 through 140-7 in filter 100, but resonant cavities 240-1 and 240-3 are redesigned to extend into the lower left hand portion of dielectric block 210 in the view of FIG. 5B, which allows the rectangular footprint of filter 200 to be reduced as compared to the rectangular footprint of filter 100 (the "rectangular footprint" refers to the smallest rectangle that completely encloses the filter when the filter is viewed from above). Coupling windows 250, 260 are provided between selected adjacent pairs of resonant cavities 240. The coupling windows may include main coupling windows 250-1 through 250-6, a cross-coupling window 260, and spurious coupling windows 270-1 through 270-3. The coupling windows 250, 260 are formed either (1) between two or more of the metallized openings 230 or (2) between a metallized opening 230 and one of the sidewalls 220 of filter 200.

The main coupling windows 250 are similar to the main coupling windows 150 of filter 100, and the cross-coupling window 260 is similar to the cross-coupling window 150 of filter 100. In each case, these "windows" 250, 260 represent a region in the dielectric block 210 that is between two adjacent resonant cavities 240 where no metallization is present so that RF energy may pass through the window between the two adjacent cavities 240. The spurious coupling windows 270 are formed by implementing the metallized openings 130 of filter 100 as a plurality of smaller metallized openings 230 (e.g., one small metallized opening for each segment of the metallized openings 130), where small regions where no metallization is present are left between the metallized openings 230 in order to form the additional spurious coupling windows 270. The spurious coupling windows 270 may be smaller than the main coupling windows 250 and/or may be located in positions where the electromagnetic fields are lower in the resonant cavities 240, and hence the amount of RF energy that will pass through the spurious coupling windows 270 is generally less than the amount of RF energy that will pass through the main coupling windows 250.

A challenge with using metallized dielectric waveguide filters in cellular systems is that these filters tend to generate undesired or "spurious" modes at frequencies that are close to the pass band. Waveguide filters may be designed to transmit an electromagnetic wave in either a transverse electric (TE) mode or a transverse magnetic (TM) mode, as is well understood by those of ordinary skill in the art. In waveguide transmission systems, including waveguide filters, other undesired transmission modes may arise that may negatively affect the response of the filter. These undesired modes are referred to as "spurious modes." Spurious modes may result in the amount of rejection being reduced in a frequency range that is above the pass band frequency range.

In many cases, cellular operators may require that the filters used in base station antennas have extremely high degrees of rejection at frequencies that are close to the pass band. If spurious modes fall within frequency ranges where such high degree of rejection is required, it may be difficult to meet the attenuation specifications.

The filter 200 further includes a metallized circular hole 280 is formed in the top surfaces of each of resonant cavities 240-2, 240-3, 240-4, 240-5 and 240-6. These metallized circular holes 280 are referred to herein as "blind holes" and may be used to shape the electromagnetic field to increase the coupling through a coupling window 250 and/or to increase the center frequency of the first spurious mode, which may help extend the pass band of the filter response. Each blind hole 280 may comprise an opening that is formed in the top portion or ceiling of the resonant cavity 240. The sidewalls and floor of this hole are metallized in the metallization process applied to the dielectric block 210 to form the blind hole 280. While the blind holes 280 are shown as having a circular cross-section, it will be appreciated that the blind holes 280 may have any appropriate shape.

Figure 6:
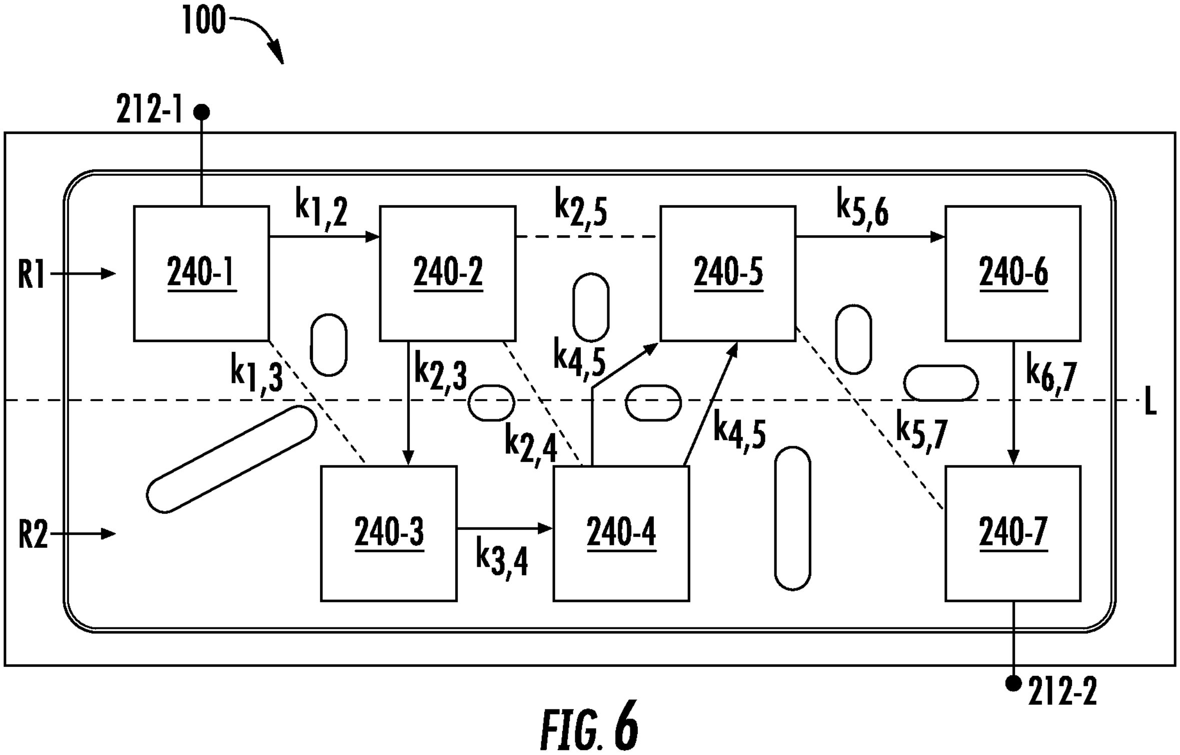
FIG. 6 is a schematic diagram illustrating the resonant cavities included in the metallized dielectric waveguide filter of FIGS. 5A-5B and the different couplings between these resonant cavities.

FIG. 6 is a schematic diagram illustrating the resonant cavities 240 included in the metallized dielectric waveguide filter 200 of FIGS. 5A-5B and the different couplings between these resonant cavities 240. As shown in FIG. 6, the resonant cavities are disposed in two rows R1, R2, with each row extending generally parallel to a longitudinal axis L of the filter 200. The main transmission path through the filter 200 extends from the first input/output port 212-1 through the seven resonant cavities 240-1 through 240-7 in numerical order to the second input/output port 212-2, as shown by the solid arrows in FIG. 6. The filter has six "main couplings" which refer to the six segments of the solid arrows that extend between pairs of adjacent resonant cavities 240 along the main transmission path. The magnitudes of these main couplings are labelled $k_{1,2}$, $k_{2,3}$, $k_{3,4}$, $k_{4,5}$, $k_{5,6}$, and $k_{6,7}$ in FIG. 6. There is one cross-coupling between resonant cavities 240-2 and 240-5 (through cross-coupling window 260) which is labelled $k_{2,5}$ in FIG. 6. The value of the percent coupling $k_{i,j}$ between two resonant cavities is defined by Equation (2):

$$ki,\ j = \frac{f_{odd} - f_{even}}{\sqrt{f_{odd} \cdot f_{even}}} \cdot 100 \qquad (2)$$

where $f_{odd}$ is the center frequency of the first transmission mode, and $f_{even}$ is the center frequency of the second transmission mode.

The couplings can be characterized by their polarity (positive or negative). Positive couplings (e.g., couplings $k_{1,2}$, $k_{2,3}$, $k_{3,4}$, $k_{4,5}$, $k_{5,6}$, $k_{6,7}$) may be readily generated by having the magnetic field distributions in the resonant cavities 240 overlap in the vicinity of the main coupling windows 250 that connect adjacent resonant cavities 240. The magnitude of the coupling may be controlled by the size of the coupling window 250. Unfortunately, as the size of a main coupling window 250 is increased, the center frequency of the first spurious mode shifts toward the pass band. This may be problematic when it is necessary to have a high level of rejection at frequencies that are close to the pass band. The blind holes 280 may be used to push the center frequency of the first spurious mode higher in frequency in order to at least partially counteract the reduction on the center frequency that occurs when the size of the main coupling window 250 is increased. The use of blind holes 280 also changes the resonant frequency of a resonant cavity 240, but this may be compensated for by changing the length of the resonant cavity 240. The provision of blind holes 280 may also increase the magnitude of the negative cross-coupling $k_{2,5}$. Unfortunately, the Q factor of the filter 200 is reduced by the provision of the blind holes 280, and the decrease in Q factor increases with increasing depths for the blind holes 280. Thus, the depths of the blind holes 280 may need to be limited to maintain a minimum required Q factor for the filter 200.

As is further shown in FIG. 6, three spurious coupling windows 270 are provided that allow for coupling between three additional pairs of resonant cavities 240 that are not adjacent each other along the main transmission path. Applicants have recognized that unintended (and unwanted) coupling may occur between certain pairs of non-adjacent resonant cavities 240 including between resonant cavities 240-1 and 240-3, between resonant cavities 240-2 and 240-4, and between resonant cavities 240-5 and 240-7. This coupling may occur, for example, because some RF energy may enter a particular resonant cavity 240 through a first main coupling window 250 and then leave the resonant cavity 240 through a second main coupling window without resonating (or with reduced resonation) so that this RF energy effectively appears as a small main coupling between two non-adjacent resonant cavities 240. Applicants believe that these unintended couplings are at least partially responsible for the non-symmetries seen in the insertion loss and return loss curves of FIG. 4B. Pursuant to embodiments of the present invention, the spurious coupling windows 270 may allow equal magnitude, oppositely signed couplings to pass between the three pairs of resonant cavities 240 identified above in order to cancel the unintended couplings. While complete or nearly complete cancellation typically optimizes performance, it will be appreciated that the magnitudes of the couplings through the spurious coupling windows 270 need not always be equal magnitude and/or exactly opposite in phase to the above-described unintended couplings.

Referring again to FIGS. 5A-6, it can be seen that metallized openings 230-1 and 230-3 through 230-8 all are generally line-shaped openings that have respective longitudinal axes that extend either generally parallel to or generally perpendicular to the longitudinal axis L of filter 200. The orientation of these metallized openings 230 is consistent with the orientations of the metallized openings 130 included in the conventional metallized dielectric filter 100 discussed above. Notably, however, metallized opening 230-2 has a different, "slant" orientation so that the longitudinal axis of metallized opening 230-2 forms an oblique angle with the longitudinal axis L of filter 200. Moreover, since the sidewalls 220 of filter 200 extend either parallel or perpendicular to the longitudinal axis L, the longitudinal axis of metallized opening 230-2 also forms an oblique angle with respect to each of the sidewalls 220-1 through 220-4. In the depicted embodiment, the longitudinal axis of metallized opening 230-2 forms an angle of about 45° with the longitudinal axis L of filter 200 as well as with sidewalls 220-1 and 220-2. In example embodiments, the longitudinal axis of metallized opening 230-2 may form an angle of between about 15° and about 75° with the longitudinal axis L of filter 200 as well as with sidewalls 220-1 and 220-2. In other example embodiments, the longitudinal axis of metallized opening 230-2 may form an angle of between about 30° and about 60° with the longitudinal axis L of filter 200.

Metallized opening 230-2 acts as a sidewall of resonant cavities 240-1 and 240-3. Since metallized opening 230-2 is slanted, resonant cavities 240-1 and 240-3 each have substantially non-rectangular shapes, unlike the resonant cavities 140 of conventional metallized dielectric filter 100. The use of a slanted resonant cavity sidewall, combined with configuring the filter 200 to have a rectangular shape, allows for an overall reduction in the rectangular footprint of filter 200 as compared to conventional filter 100. In particular, since the lower left corner of the dielectric block 110 of filter 100 is "filled in" in the implementation of filter 200, it becomes possible to extend the width of resonant cavity 240-1 as compared to resonant cavity 140-1, which allows the length of resonant cavity 240-1 to be reduced as compared to the length of resonant cavity 140-1. Similarly, the additional region of dielectric material added in filter 200 allows resonant cavity 240-3 to be shifted to the left (in the views of FIGS. 5B and 6) as compared to the position of resonant cavity 140-3 of filter 100. Since resonant cavities 240-1 and 240-3 do not extend as far to the right from sidewall 220-2 as do the corresponding resonant cavities 140-1, 140-3 of filter 100, the overall length of filter 200 may be reduced significantly as compared to the filter 100 (e.g., from about 57 mm to about 48 mm). In addition, a small reduction in the width of filter 200 as compared to the width of filter 100 may also be possible. As a result, the rectangular footprint of filter 200 may be on the order of 20% smaller than the rectangular footprint of filter 100, which represents a significant savings in terms of space, cost and weight. The slanted metallized opening 230-2 facilitates these savings by allowing the additional volume of dielectric material that "fills in" the recess of filter 100 to be split between resonant cavities 240-1 and 240-3, and by also directing the resonation of the RF energy within each cavity in a useful manner.

It should also be noted that metallized openings 230 are substantially shorter than metallized openings 130 that are included in the conventional filter 100. Two of the three metallized openings 130 also extend to the edge of the filter 100. These metallized openings 130 significantly degrade the structural integrity of filter 100 and, in particular, make filter 100 very susceptible to twisting forces that could crack the filter 100 or even break it in half. In contrast, filter 200 has much shorter metallized openings 230 and none of the metallized openings 230 (at least in the depicted embodiment) extend to a sidewall 220 of filter 200. This provides a much more mechanically robust filter 200. Additionally, long metallized openings such as the metallized openings 130 of filter 100 are more difficult to manufacture than shorter metallized openings, and hence the filter 200 may also be easier to manufacture than the filter 100.

As shown in FIGS. 5A-5B, metallized opening 230-4 is positioned substantially in the middle of the region of dielectric block 210 that is between resonant cavities 240-4 and 240-5. As shown in FIG. 6, this design creates a pair of main coupling windows 250-4A, 250-4B (see FIG. 5A) between resonant cavities 240-4 and 240-5 as opposed to a single coupling window 250. This design allows the spurious coupling window 270-2 to generate a desired amount of coupling between resonant cavities 240-2 and 240-4, while also allowing the appropriate amount of coupling between resonant cavities 240-4 and 240-5.

Figure 7:
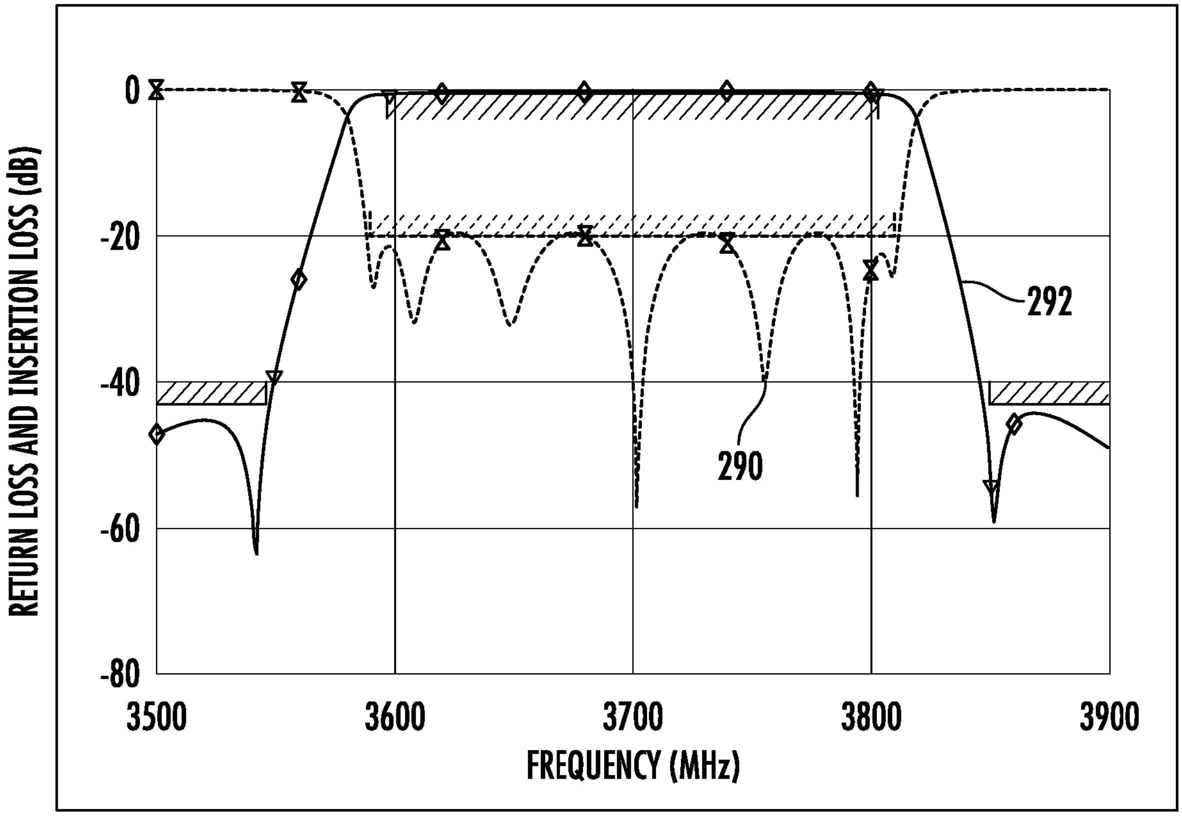
FIG. 7 is a graph illustrating the simulated return loss and insertion loss for the filter of FIGS. 5A-5B.

FIG. 7 is a graph illustrating the simulated return loss and insertion loss for the filter of FIGS. 5A-5B. As shown in FIG. 7, the filter 200 exhibits excellent return loss (curve 290) and insertion loss (curve 292) performance. As shown in FIG. 7, a return loss of less than −19 dB is achieved across the entire pass band, and the return loss rises very sharply just outside of the pass band (to less than −1 dB within about 25 MHz on either side of the pass band). The insertion loss curve also exhibits excellent performance, with the insertion loss being less than 0.6 dB across the full pass band, and two symmetric transmission zeros (60 dB rejection) are provided at about 50 MHz outside of either side of the pass band. Filter 200 also exhibits better out-of-band rejection as compared to filter 100, which may be important in some applications. The spurious coupling windows are attributed as providing the improved symmetry in the locations and depths of the transmission zeros.

Ports 212-1 and 212-2 are referred to as input/output ports above. This is because in may embodiments the filters may process both transmit and receive signals, and hence RF signals may input to the filter through both input/output ports during normal operation. thus, it will be appreciated that RF energy can flow through the filters according to embodiments of the present invention along the main transmission paths thereof in either direction.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A metallized dielectric waveguide filter, comprising:

a first input/output port;

a second input/output port;

a dielectric block having a metallized top surface, a metallized bottom surface and a plurality of metallized outer sidewalls, the dielectric block further including a plurality of metallized openings that extend into the interior of the dielectric block, the metallized openings dividing the dielectric block into a plurality of resonator cavities, wherein a first of the metallized opening forms a first wall between a first of the resonator cavities and a second of the resonator cavities, the second resonator cavity being adjacent the first of the resonator cavities along a main transmission path through the dielectric block that extends between the first input/output port and the second input/output port sequentially through each of the resonator cavities, and a second of the metallized opening forms a second wall, and wherein the first wall and the second wall define a coupling window between the first of the resonator cavities and a third of the resonator cavities.

2. The metallized dielectric waveguide filter of claim 1, wherein the third of the resonator cavities is adjacent the second of the resonator cavities along the main transmission path.

3. The metallized dielectric waveguide filter of claim 1, wherein the resonator cavities are arranged in a first row and a second row within the dielectric block, where each of the first row of resonator cavities and the second row of resonator cavities extends parallel to a longitudinal axis of the metallized dielectric waveguide filter, and wherein the first of the resonator cavities and the third of the resonator cavities are in different ones of the first and second rows.

4. The metallized dielectric waveguide filter of claim 1, wherein the first of the metallized openings extends at an oblique angle with respect to a first of the metallized outer sidewalls.

5. The metallized dielectric waveguide filter of claim 1, wherein a third of the metallized openings extends substantially into a central region between a pair of resonator cavities that are adjacent each other along the main transmission path so as to define first and second main coupling windows between the pair of resonator cavities.

6. A metallized dielectric waveguide filter, comprising:

a first input/output port;

a second input/output port;

a dielectric block having a metallized top surface, a metallized bottom surface and a plurality of metallized outer sidewalls, the dielectric block further including a plurality of metallized openings that extend into the interior of the dielectric block, the metallized openings dividing the dielectric block into a plurality of resonator cavities, wherein a main transmission path is defined through the dielectric block that extends between the first input/output port and the second input/output port sequentially through each of the resonator cavities, and wherein a first of the metallized openings extends substantially into a central region between a first of resonator cavities and a second of the resonator cavities that are adjacent each other along the main transmission path so as to define first and second main coupling windows between the first and second of the resonator cavities.

7. The metallized dielectric waveguide filter of claim 6, wherein the dielectric block is divided into a first row of resonator cavities and a second row of resonator cavities, where each of the first row of resonator cavities and the second row of resonator cavities extends parallel to a longitudinal axis of the metallized dielectric waveguide filter, and wherein the first of resonator cavities is in the first row and the second of resonator cavities is in the second row.

8. The metallized dielectric waveguide filter of claim 6, wherein the first of the metallized openings extends at an angle of between 15° and 75° with respect to both a first of the metallized outer sidewalls and with respect to a second of the metallized outer sidewalls that is substantially perpendicular to the first of the metallized outer sidewalls.

9. The metallized dielectric waveguide filter of claim 8, wherein the first of the metallized openings is positioned between one of the resonator cavities in a first row and one of the resonator cavities in a second row.

10. The metallized dielectric waveguide filter of claim 6, wherein a second of the metallized openings forms a first wall between a third of the resonator cavities and a fifth of the resonator cavities, a third of the metallized opening forms a second wall between the third of the resonator cavities and a fourth of the resonator cavities that is between the third of the resonator cavities and the third fifth the resonator cavities along the main transmission path, the first wall and the second wall defining a coupling window between the third of the resonator cavities and the fifth of the resonator cavities.

11. The metallized dielectric waveguide filter of claim 10, wherein the dielectric block is divided into a first row of resonator cavities and a second row of resonator cavities, where each of the first row of resonator cavities and the second row of resonator cavities extends parallel to a longitudinal axis of the metallized dielectric waveguide filter, and wherein the third of the resonator cavities and the fifth of the resonator cavities are in different ones of the first and second rows.

12. A metallized dielectric waveguide filter, comprising:

a first input/output port;

a second input/output port;

a dielectric block having a metallized top surface, a metallized bottom surface and a plurality of metallized outer sidewalls, the dielectric block further including a plurality of metallized openings that extend into the interior of the dielectric block, the metallized openings forming metallized inner walls within the dielectric block, wherein the metallized outer walls and the metallized inner walls define a plurality of main coupling windows that form a main transmission path through the dielectric block that extends between the first input/output port and the second input/output port sequentially through each of the resonator cavities, a first cross-coupling window between two of the resonant cavities that are not adjacent each other along the main transmission path, and a first spurious coupling window, wherein the first spurious coupling window is configured to generate a cross-coupling between first and second of the resonant cavities that are not adjacent each other along the main transmission path that substantially cancels coupling between the first and second of the resonant cavities that occurs along the main transmission path.

13. The metallized dielectric waveguide filter of claim 12, wherein the dielectric block is divided into a first row of resonator cavities and a second row of resonator cavities, where each of the first row of resonator cavities and the second row of resonator cavities extends parallel to a longitudinal axis of the metallized dielectric waveguide filter, and wherein the first and second of the resonator cavities are in different ones of the first and second rows.

14. The metallized dielectric waveguide filter of claim 12, wherein the spurious coupling window is defined between a first of the metallized inner walls and a second of the metallized inner walls.

15. The metallized dielectric waveguide filter of claim 12, wherein the dielectric block is divided into a first row of resonator cavities and a second row of resonator cavities, where each of the first row of resonator cavities and the second row of resonator cavities extends parallel to a longitudinal axis of the metallized dielectric waveguide filter.

16. The metallized dielectric waveguide filter of claim 15, wherein the main transmission path crosses from the first row of resonator cavities to the second row of resonator cavities at least twice.

17. The metallized dielectric waveguide filter of claim 12, wherein a first of the metallized openings extends substantially into a central region between a pair of resonator cavities that are adjacent each other along the main transmission path so as to define first and second main coupling windows between the pair of resonator cavities.

18. The metallized dielectric waveguide filter of claim 17, wherein the spurious coupling window is defined by the first of the metallized openings and a second of the metallized openings.

19. The metallized dielectric waveguide filter of claim 12, wherein at least one of the resonator cavities has an angled inner sidewall.

20. The metallized dielectric waveguide filter of claim 6, wherein a second of the metallized openings defines a third main coupling window between the second of the resonator cavities and a third of the resonator cavities, and wherein the first main coupling window is defined in between the first and second of the metallized openings.

21. The metallized dielectric waveguide filter of claim 6, wherein a third of the metallized openings isolates the first of the resonator cavities from a fourth of the resonator cavities, and wherein the second main coupling is defined in between the second and fourth of the metallized openings.

* * * * *